Nov. 6, 1923. 1,473,589
A. TELLESON ET AL
AUXILIARY SPRING DEVICE FOR VEHICLES
Filed Oct. 15, 1920 2 Sheets-Sheet 1
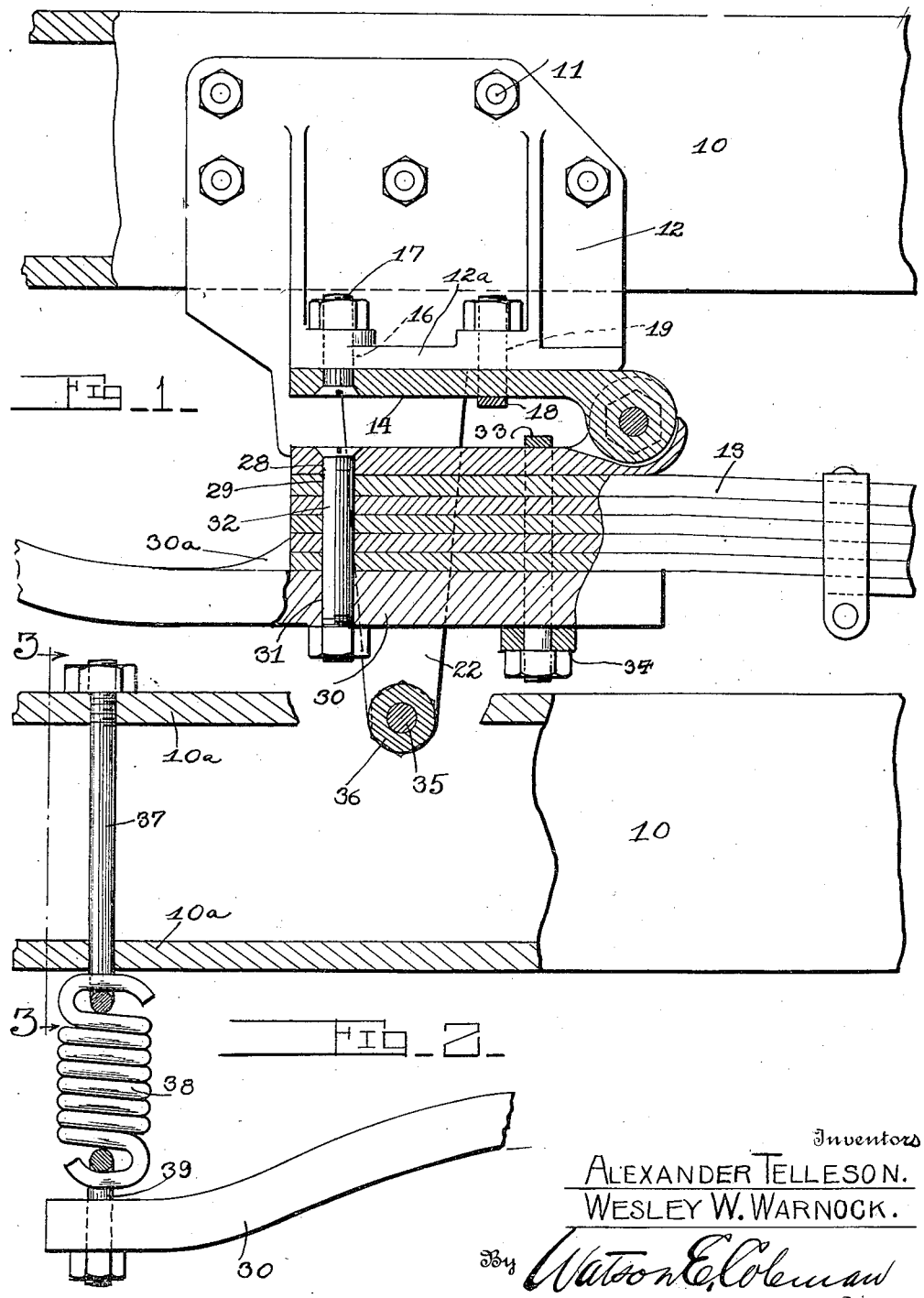
Inventors
ALEXANDER TELLESON.
WESLEY W. WARNOCK.
By Watson E. Coleman
Attorney

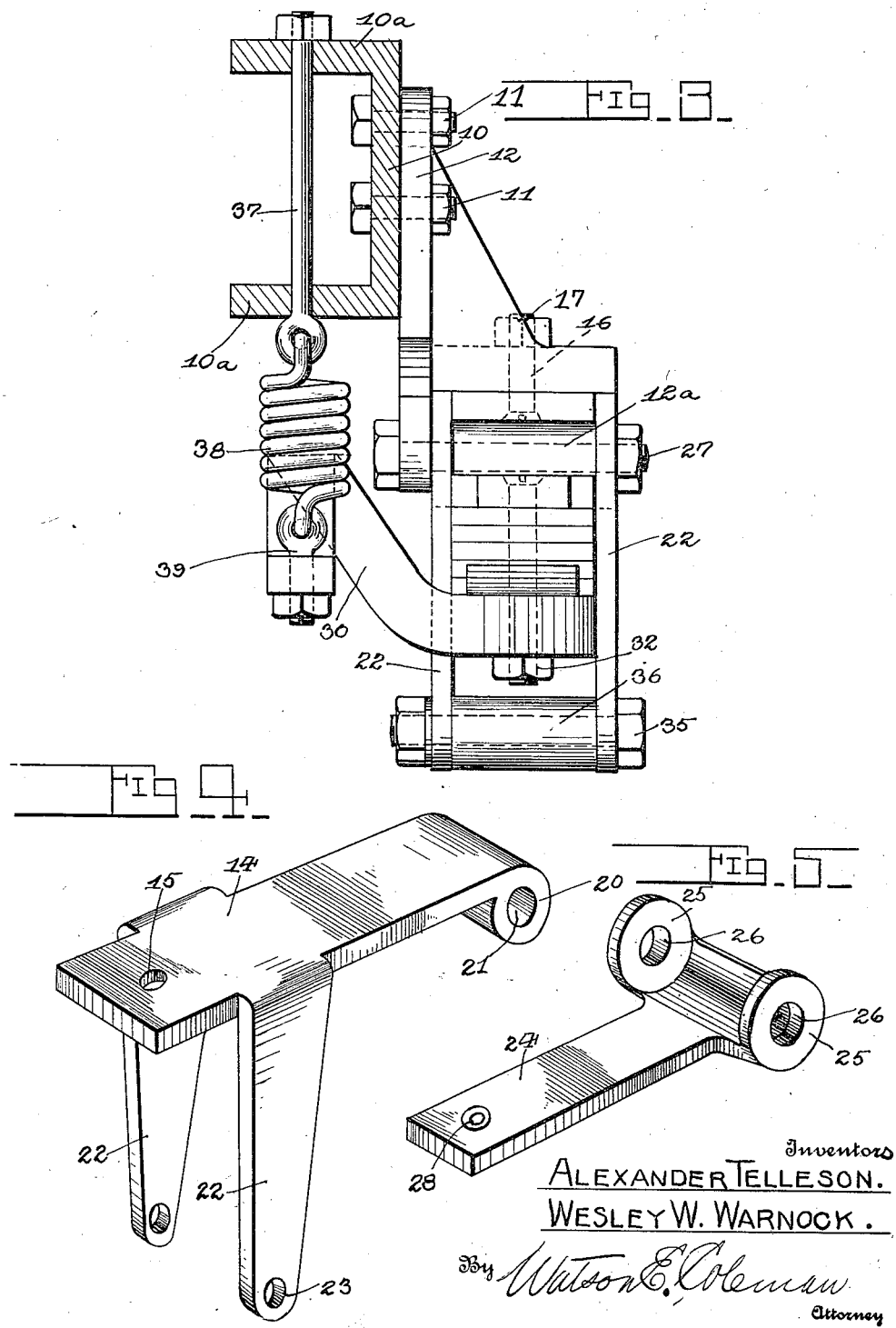

Patented Nov. 6, 1923.

1,473,589

UNITED STATES PATENT OFFICE.

ALEXANDER TELLESON AND WESLEY W. WARNOCK, OF CASTOR, ALBERTA, CANADA.

AUXILIARY SPRING DEVICE FOR VEHICLES.

Application filed October 15, 1920. Serial No. 417,131.

*To all whom it may concern:*

Be it known that we, ALEXANDER TELLESON and WESLEY WELLINGTON WARNOCK, citizens of Great Britain, residing at Castor, Alberta, Canada, have invented certain new and useful Improvements in Auxiliary Spring Devices for Vehicles, of which the following is a specification, reference being had to the accompanying drawings.
This invention relates to auxiliary spring devices for use in supplementing the action of the springs of vehicles which employ springs of the cantilever type, as more particularly evidenced by vehicles such as the Chevrolet "Four Ninety" automobile.

An important object of the invention is to provide a device of this character which may be employed without in any manner altering the construction of the body or springs.

A still further object of the invention is to provide a device of this character which may be readily applied without the necessity of extraordinary mechanical skill.
Other objects and advantages of the invention will become apparent throughout the course of the following description.

In the accompanying drawings, wherein for the purpose of illustration is shown a preferred embodiment of our invention, and wherein like reference characters designate like parts throughout:

Figure 1 is a fragmentary side elevation partly in section of the frame suspension end of the spring showing our invention applied thereto, the end of the auxiliary spring arm being broken away;

Figure 2 is a side elevation partly in section of the inner end of the spring arm;
Figure 3 is a section taken on the lines 3—3 of Figure 2, and Figures 4 and 5 are perspective views of the upper and lower hinge plates employed in our invention.
Referring now more particularly to the drawings, the numeral 10 indicates the usual channel iron side bar with the body frame of an automobile to which is secured as at 11 a bracket 12 embodying a horizontal extending portion 12$^a$ at the bottom thereof. To this braket in the usual construction is secured the inner end of a spring 13, the outer end of which is secured to the front or rear axle as the case may be. As the mounting of the outer end of the spring 13 is not in any manner altered from that which is usual, the same is not herein illustrated.

In accordance with our invention, the inner end of the spring 13 is removed from the bracket 12 and into the under face of the bracket is secured a plate 14. This plate 14 is provided at its inner end with an opening 15 adapted to coact with an opening 16 formed in the horizontal portion 12$^a$ of the bracket 12 for the reception of a bolt 17, the bolt 17 preferably being of the flat-head machine screw order and having its head counter-sunk in the under surface of the plate and flush therewith. Fastened at the outer end of the plate 14 is a U-bolt 18 having its arms upwardly directed through the openings 19 formed in the bracket and being secured thereto. The openings 16 and 19 form a normal construction of the bracket 12 and the securing means extending through the plate 14 in the manner described, maintain the plate 14 against movement and in a position such that it extends longitudinally of the frame of the vehicle in substantially the same direction as that normally assumed by the spring 13. It will be understood that by the terms "inner" and "outer" herein employed we mean inwardly of the longitudinal ends of the frame or outwardly toward the ends of the frame.

The plate 14 is provided upon the outer end thereof with a downwardly projecting portion 20 having formed therein a transverse bore 21 for a purpose presently to appear. The plate 14 is likewise provided adjacent the inner ends thereof and at the sides thereof with downwardly directed arms 22 having formed in the lower ends thereof alined openings 23. The plate 14 will hereafter be referred to as the upper hinge plate. A lower hinge plate 24 is provided having at its outer end upstanding portions 25 adapted to abut the ends of the portion 20 of the upper hinge plate 14, and provided with openings 26 alined with the opening 21 thereof and adapted for the reception of a hinge bolt 27 extending through these openings.

The lower hinge plate 24 is provided in the upper surface thereof with an opening 28 adapted to aline with openings 28 formed through the leaves of the spring 13 and adjacent the butt or inner ends thereof. The numeral 30 designates the inner end of a spring lever arm 30 which is provided upon its upper surface with a lug 30ª abutting the butt ends of the leaves of the spring 13. This end of the lever arm is provided with an opening 31 alineable with the openings 29 of the spring 13 and combining with these openings and with the opening 28 of the lower hinge plate 24 to receive the bolt 32 which is likewise preferably of the flat-head machine screw order and having its head counter sunk in the plate 24. An inverted U-shaped bolt 33 is employed having the ends of the arms thereof extending through a plate 34 and extending transversely of the lever arm 30, adjacent the extreme outer end thereof and held against movement by nuts in the usual manner.

The arms 22 extend downwardly upon each side of the spring 13, the lower hinge plate 24 and the outer end of the arm 30 and likewise extend below the arm 30, and through the openings 23 thereof is directed a bolt 35. Upon this bolt, intermediate the arms 22, is rotatably mounted a roller 36. In event of breakage at the point of connection of the hinge plates or at any point below the upper hinge plate, the spring dropping downwardly will come to rest upon the roller 36 which will effectually prevent downward movement.

Inwardly of bracket 12, an eye bolt 37 is vertically directed through the flanges 10ª of the channel iron side bars 10 and has the eye thereof directed downwardly and adapted for the reception of the upper end of a coil tension spring 38, the lower end of which is secured in the eye of an eye bolt 39 secured to the inner end of the spring lever arm 30.

It will be seen that a shock imparted to the forward end of the spring 13 will, in addition to being cushioned by the spring 13, cause a rocking movement of the spring 13 upon its pivot as formed by the hinge plates and accordingly cause a movement of the spring lever arm 30 which is considerably magnified at the outer end thereof. As downward movement of the outer end of the arm 30 will cause expansion of the springs 38, this movement is resisted. It will be seen that the spring 38 supplements the spring 13.

It will be obvious that the construction hereinbefore set forth is by reason of its simplicity and the ease with which it may be applied to existing vehicles particularly well adapted for the use for which it is intended; and it will likewise be obvious that the construction we hereinbefore set forth is capable of some change without in any manner departing from the spirit of our invention. We, accordingly, do not limit ourselves to the construction hereinbefore set forth, except as so limited by the subjoined claims.

What we claim is:

1. In a device of the type described and in combination with a side bar having a bracket secured thereto, of a pair of plates hinged together at corresponding ends, one of said plates being secured to said bracket, a spring secured adjacent its inner end to the other of said hinge plates, the hinged connection of said plates being at the end thereof remote from the inner end of the spring, a lever arm secured to the inner end of said spring and to said last named hinge plate, a spring connecting the lever arm and side bar, said first named hinge plate embodying downwardly extending arms straddling the spring and other hinge plate and having their ends disposed below said spring lever arm, a transverse member connecting the arms below said spring lever arm, and a roller mounted on said transverse member, the arms of the first named hinge plate having their point of attachment thereto spaced from the hinged connection of the plates.

2. The combination with the side bar of a vehicle having a bracket secured thereto, a hinge having its upper leaf attached to the bracket, a leaf spring having its butt end arranged below the lower leaf, a spring lever arm arranged below said leaf spring, securing means connecting the lower hinge leaf, leaf spring and spring lever arm, a second spring, securing means connecting one end of said spring and the side bar, a connection between the opposite end of the second spring and the free end of the spring lever arm, the pivot of said hinge being disposed at the ends of the leaves thereof remote from the butt end of said leaf spring, of a pair of arms extending downwardly from the sides of the upper hinge leaf and connected with the upper hinge leaf adjacent the end thereof remote from the pivotal connection of the hinge, said arms being arranged upon opposite sides of said lower hinge plate, spring and spring lever arm and slidably abutting the side faces of the leaves of the spring, the lower ends of said arms being disposed below said spring lever arm and provided with aligned openings, securing means extending through said openings, and a roller mounted on said securing means intermediate said arms.

3. In a safety attachment for vehicle leaf spring mountings, a hinge having its upper leaf secured to the chassis of the vehicle and its lower leaf secured to the vehicle spring, arms carried by the upper leaf and straddling the lower leaf and spring and slidably abutting the sides of the leaves of the spring, and a connection between the free ends of said arms arranged below said spring.

In testimony whereof we hereunto affix our signatures.

ALEXANDER TELLESON.
WESLEY W. WARNOCK.